May 26, 1925.  1,539,348
L. J. BOTSCHELLER
LOCK WASHER
Filed Oct. 27, 1924
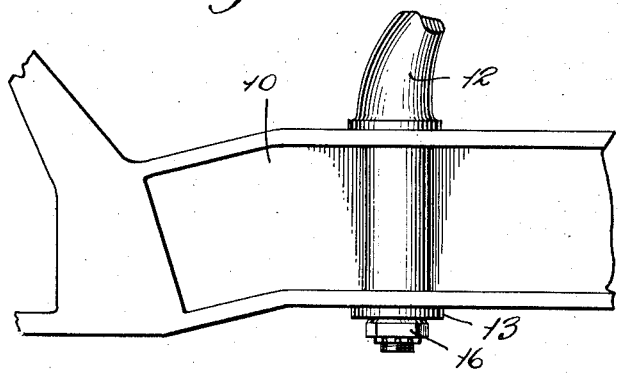
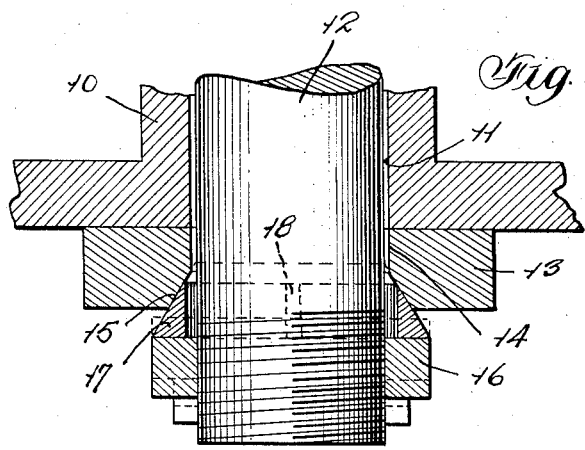
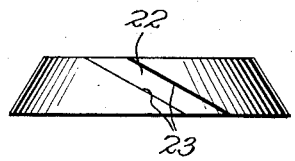
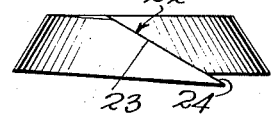
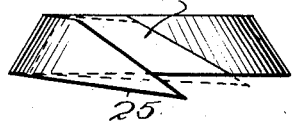
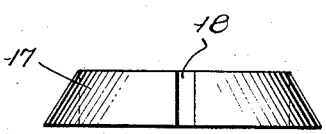
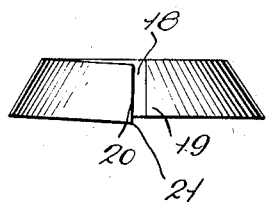
Inventor
Leo J. Botscheller.
By Frank H. Borden
Attorney Patented May 26, 1925.

1,539,348

UNITED STATES PATENT OFFICE.

LEO J. BOTSCHELLER, OF DALTON, PENNSYLVANIA.

LOCK WASHER.

Application filed October 27, 1924. Serial No. 746,223.

*To all whom it may concern:*

Be it known that I, LEO J. BOTSCHELLER, a citizen of the United States, residing at Dalton, in the county of Lackawanna and State of Pennsylvania, have invented certain new and useful Improvements in Lock Washers, of which the following is a specification.

My invention relates to lock washers pertaining, for instance, to lock washers applicable to the connection between the axle, radius rod, and perch of an automobile.

Mechanics find a constant source of trouble in a certain type of automobile at the radius rod connection to the axle, in which vibration and shocks cause wear requiring constant tightening of the nut on the perch, or else frequently replacement of the parts.

In this particular construction registering perch or bolt holes are formed in the axle and radius rod, being of greater diameter than the perch or bolt that extends through them. The radius rod is countersunk adjacent the bolt hole, and the nut threaded upon the perch has an integral bevelled flange which is supposed to seat in the countersink to lock the radius rod and nut together. In practice, however, the bevelled portion turning with the nut, binds on the surface of the countersink before it fully seats, and relative vibration of the axle and radius rod causes destructive wear. There are a number of reasons for this, but it is principally due to the facts that the bevelled portion must turn with the nut, and that the bolt hole in the radius rod is larger than the bolt, and the bolt or perch therefor may extend through the countersink eccentrically thereof. Obviously this brings one portion of the countersink into engagement with the bevelled part of the nut without really seating. This binding action is also assisted by the pressure on the perch from the weight of the car, which it supports.

It is an object of my invention to eliminate any binding between the parts and to form a rigid and immovable connection, but which may be readily disassembled when desired.

It is a further object of my invention to provide a lock washer that will not only lock the nut to the radius rod, but also the radius rod to the perch, and in addition will lock the nut in its operative tightened position.

In carrying out my invention I provide a resilient, split, bevelled washer, adapted to extend into the countersink, and upon pressure from the nut, to be wedged together to converge upon and rigidly grip the perch, to rigidly engage the countersink, and by its resilience to lock the nut against retraction.

In the accompanying drawings,

Fig. 1 is a front elevation of a portion of an axle with my invention in place in an operative locking condition.

Fig. 2 is an enlarged vertical section through an axle, radius rod, nut, and a lock washer, showing in full lines the position of the parts before pressure is applied by the nut, and showing in dotted lines the locking position of the washer after it has been compressed under pressure from the nut.

Fig. 3 is a side elevation of the preferred form of lock washer, with butt ends.

Fig. 4 is a slightly modified form with butt ends, in which one end of the washer projects below the plane of the other end, in order to enhance the nut locking feature of the invention.

Fig. 5 is a side elevation of a further modified form in which the washer is split by a sloping out so as to provide two wedging or camming surfaces, for a purpose to be described.

Fig. 6 is a similar view of the form shown in Fig. 5, after the washer has been compressed till the camming faces contact.

Fig. 7 is a side elevation of a further slightly modified form of washer, in which in addition to a sloping out to split the washer as in Fig. 5, one end of the washer is bent downwardly to enhance the nut-locking action of the washer, in dotted lines the downwardly extending portion has been shown bent up to the plane of the other end as by the pressure from the nut.

Purely for the purpose of illustration the invention has been shown as applied to an axle, radius rod and perch, connection, although obviously applicable to a wide range of construction, including for instance, fish plate and rail connections. The axle 10 has a bolt or perch hole 11, through which the perch 12 extends. The radius rod 13 has perch hole 14, terminating at the bottom in the countersink 15; through both of which the perch also extends, as shown in Fig. 2. The perch is threaded to receive the plane faced nut 16 adapted to bear against the bottom face of the washer forming my invention.

In its preferred form, and as shown in Fig. 3, the lock washer comprises a resilient externally bevelled annulus 17, radially split or cut as at 18. As shown in detail in Fig. 2, after the parts have been assembled and the washer 17 extended somewhat into the countersink 15, the washer has no locking contact with any surface. However, as the nut is turned on its threads, the pressure forces the washer into the countersink, the tapering walls of which have a camming or wedging action upon the washer, with a resultant converging or clamping effect thereon. Obviously as the washer is constricted its inner diameter becomes smaller so that it is forced into a rigid locking engagement with the perch or bolt carrying the nut. It will be noted, that being an entirely independent element, and having its motion solely vertically, the washer will not only seat fully and properly in the countersink, but will also center and hold the perch. Pressure from the nut having forced the washer into the countersink, its engagement therewith centers and locks the radius rod to the washer, and thus to the perch. Due to its resilience, the washer tends to resist the constricting action of the pressure, that is, it tends to spring downwardly against the nut. This pressure is sufficient to firmly lock the nut against retraction by rotation on the threads of the perch.

It might, in some cases, be desirable to enhance this nut locking action of the washer, and to that end, the modified form shown in Fig. 4 may be used. In that form of the device, the washer has a similar transverse or radial slot 18, as the form shown in Fig. 3, this slot thus forms two edges 19 and 20. By deflecting one edge, as 20, a bit below the plane of the remainder of the washer, and if necessary drawing the edge out to a biting edge as at 21, I enhance to a material extent the nut locking qualities of the washer, after which its action is the same, except for the downward pressure of the edge 20, which forces the biting edge 21 into the nut, with increased pressure to prevent it from backing off the perch.

The form of washer disclosed in Fig. 5 includes a sloping slot or cut 22, forming at each end of the washer, vertically inclined camming or wedging edges or faces 23. As shown in Fig. 6, after sufficient pressure has been placed upon the washer its edges being forced together, results in movement of one face upon the other so that an acute angled shoulder 24 is forced slightly below the bottom plane of the washer, to bite into the nut to prevent it from backing off. This is simply another way of enhancing the nut locking qualities of the washer, if desired. This washer also provides an engaging surface for all parts of the countersink.

In Fig. 7, the washer has a sloping slot or cut 22, and in addition one edge 25 is formed below the plane of the washer, to enhance the nut locking qualities of the washer, similar to the washer shown in Fig. 4.

As noted, this invention forms a rigid and effective lock in three directions, namely in locking the perch, the radius rod, and the nut. Vibration has no effect upon it, and as the connection is rigid no wear can take place.

Although for illustration I have shown the invention as applied to an axle and radius rod connection, yet, as noted, it may be applied in any place where a rigid and firm locking action is desired, although of more value where vibration is to be considered.

I claim as my invention:—

1. A lock washer adapted for embracing association with a bolt, said bolt extending through a counter-sunk bolt hole in an element and carrying a substantially plane faced nut, said washer comprising a resilient split externally beveled annulus having three gripping and locking surfaces, said annulus adapted to extend into the countersink and surround the bolt, a bottom surface thereof for contacting with the plane face of the nut, an external surface thereof for wedging engagement with the countersink, and an internal surface adapted for embracingly engaging the bolt, the upper edge of the washer adapted to be forced uniformly and concentrically toward the bolt hole at the inner end of the countersink, the whole so arranged that the washer centers and locks the bolt in the element, simultaneously locking the nut against retrogression.

2. A removable re-usable lock washer adapted for embracing association with a bolt carrying a substantially plane faced nut, said bolt extending through a countersunk bolt hole in an element, said washer comprising a resilient, split annulus, a section through any point of which is a right-angled triangle, and having three gripping and locking surfaces, a bottom surface to contact with the plane face of the nut, an external surface for wedging engagement with the countersink, and an internal surface for embracingly engaging said bolt, said internal surface being an arc of a true circle, an upper edge adapted to be forced under pressure from the nut uniformly and concentrically toward the bolt hole at the inner end of the countersink, the whole so arranged that the washer centers and locks the bolt against vibration or movement relative to the element, and due to its resilience simultaneously locks the nut against undesired retrogression.

In testimony whereof I affix my signature.

LEO J. BOTSCHELLER.